United States Patent
Kikuyama et al.

(10) Patent No.: US 6,666,973 B1
(45) Date of Patent: Dec. 23, 2003

(54) METHOD FOR FIXING FLUORINE AND PHOSPHORUS IN WASTE WATER CONTAINING FLUOROPHOSPHORIC ACID-DERIVED COMPOUND TO REMOVE THEM

(75) Inventors: Hirohisa Kikuyama, Osaka-fu (JP); Toshirou Fukudome, Osaka-fu (JP); Masayuki Miyashita, Osaka-fu (JP)

(73) Assignee: Stella Chemifa Kabushiki Kaisha, Osaka (JP)

( * ) Notice: Subject to any disclaimer, the term of this patent is extended or adjusted under 35 U.S.C. 154(b) by 0 days.

(21) Appl. No.: 09/890,754

(22) PCT Filed: Feb. 28, 2000

(86) PCT No.: PCT/JP00/00471
§ 371 (c)(1),
(2), (4) Date: Feb. 12, 2002

(87) PCT Pub. No.: WO00/46157
PCT Pub. Date: Aug. 10, 2000

(30) Foreign Application Priority Data

Feb. 5, 1999 (JP) ............................................. 11-029413

(51) Int. Cl.⁷ ................................................. C02F 1/04
(52) U.S. Cl. ..................... 210/712; 203/34; 159/47.3; 210/718; 210/724; 210/737; 210/750; 423/321.1; 423/490
(58) Field of Search ................................ 210/712, 718, 210/724, 726, 737, 750, 752, 753, 754, 765, 766, 774; 203/34, 39; 159/47.3; 423/321.1, 490

(56) References Cited

U.S. PATENT DOCUMENTS 3,843,767 A * 10/1974 Faust et al. .............. 423/157.3
4,698,163 A * 10/1987 Zibrida ........................ 210/713

FOREIGN PATENT DOCUMENTS

| JP | 06170380 A | 6/1994 |
| JP | 08010775 A | 1/1996 |
| JP | 10310421 A | 11/1998 |

* cited by examiner

Primary Examiner—Peter A. Hruskoci
(74) Attorney, Agent, or Firm—Randall J. Knuth

(57) ABSTRACT

A method is provided for fixing and eliminating fluorine and phosphorus in waste water wherein the waste water includes a fluorophosphate compound in which hydrochloric acid is added to the waste water including the fluorophosphate compound. The waste water to which hydrochloric acid has been added is heated in order to decompose the fluorophosphate compound into hydrogen fluoride and phosphoric acid, while hydrogen chloride gas located within a treating vessel in which the waste water is contained is introduced into a condenser provided outside of the treating vessel, and then a calcium salt is added to the waste water after decomposition in order to fix and eliminate fluorine and phosphorus.

15 Claims, 4 Drawing Sheets

METHOD FOR FIXING FLUORINE AND PHOSPHORUS IN WASTE WATER CONTAINING FLUOROPHOSPHORIC ACID-DERIVED COMPOUND TO REMOVE THEM

BACKGROUND OF THE INVENTION

1. Field of the Invention.

The present invention relates to a method of fixing and eliminating fluorine and phosphorus in waste water including a fluorophosphate compound.

2. Description of the Related Art.

In recent years, a fluorophosphate compound has been taken into confidence in every direction, and has been increased in quantity consumed. Among others, lithium hexafluorophosphate has been rapidly increased in quantity demanded as an electrolyte for a secondary lithium ion battery. Waste water which arises when a hexafluorophosphate is produced, or when a battery is manufactured, or a waste battery is withdrawn, is necessarily contaminated with fluorophosphoric acid. Since fluorophosphate compounds including $PF_6^-$ are stable, it is difficult to eliminate fluorine therefrom by merely adding a calcium salt thereto for treatment. In particular, when it is desired to decrease fluorine to an amount of 50 ppm or less in remaining concentration, it is difficult to decrease to such a concentration.

As a method of fixing fluorine from waste water including fluorine so as to eliminate the same, a method which comprises adding a calcium salt thereto so as to produce calcium fluoride to eliminate the same has been commonly used. However, in the case of waste water including a fluorophosphate compound, it is difficult to fix fluorine and/or phosphorus according to this conventional method wherein a calcium salt is added thereto for treatment.

On the other hand, as a method of fixing fluorine in waste water including a fluorophosphate compound, a technique as described in Japanese Patent Kokai (Laid-Open) No. 170380/94 is known.

This technique is the one of fixing fluorine as calcium fluoride, wherein sulfuric acid is added to waste water including fluorophosphate ions so that the concentration of sulfuric acid can be in the range of about 25% to about 35% by weight, and it is heated at a temperature of 200° to 80° C. for a period of 0.5 to 2 hours, and thereafter, a calcium compound is added thereto.

However, according to this technique, because of using a large amount of sulfuric acid, a large amount of calcium hydroxide is required for neutralizing iron content therein. Furthermore, as result of neutralization, a large amount of calcium sulfate is produced as a by-product, and thus it is necessary to treat the same as industrial wastes.

Besides, the amount thereof to be treated as industrial wastes is immense. For example, when waste water including about 70000 ppm of F is treated in an amount of 1000 kg, a cake thereof is caused as industrial wastes in an amount of 1000 to 1100 kg.

It is an object of the present invention to provide a method of fixing and eliminating fluorine and phosphorus in waste water including a fluorophosphate compound, which makes it possible to reduce the concentrations of fluorine and phosphorus in the waste water including the fluorophosphate compound to a very low level, which has been difficult according to a conventional calcium salt addition method.

It is an object of the present invention to provide a method of fixing and eliminating fluorine and phosphorus in waste water including a fluorophosphate compound, according to which a small amount of an acid is sufficient for use, and the occurrence of industrial waste can be remarkably suppressed.

SUMMARY OF THE INVENTION

According to the present invention, a method of fixing and eliminating fluorine and phosphorus in waste water including a fluorophosphate compound is characterized in that al hydrochloric acid is added to the waste water including the fluorophosphate compound so that the concentration of hydrochloric acid in the waste water can be in the range of 2% to 10% by weight: and then the waste water to which hydrochloric acid has been added is heated to a temperature of 80° C. to the boiling point of the waste water so as to decompose the fluorophosphate compound into hydrogen fluoride and phosphoric acid, while hydrogen chloride gas in a treating vessel in which the waste water is contained is introduced into a condenser which is provided out of the treating vessel so as to condense and reflux a volatile vapor; and thereafter, a calcium salt is added to the waste water after decomposition so as to fix and eliminate fluorine and phosphorus.

Effect (Hydrochloric Acid)

According to the present invention, first of all, hydrochloric acid is added to waste water including a fluorophosphate compound so that the concentration of hydrochloric acid in the waste water can be in the range of 2% to 10% by weight, so as to acidify the waste water. Incidentally, when hydrochloric acid is added thereto so as to heat and hydrolyze the waste water, it is preferred to agitate the same by using a stirring apparatus.

Fluorophosphate ions are stably in an aqueous solution, and it is said that they are not decomposed even in a boiled state in an aqueous alkaline solution, while are slowly hydrolyzed in an aqueous acid solution.

The present inventor has been devoted to studying the decomposition of fluorophosphate ions. Consequently, it has been found that hydrochloric acid is added thereto, and the mixture is subjected to heat treatment, and thereby fluorophosphoric acid is decomposed into hydrogen fluoride and orthophosphoric acid in a relatively short period of time. With respect to using hydrochloric acid, Japanese Patent Kokai (Laid-Open) No.170380/94 discloses that in order to hydrolyze fluorophosphate ions, even hydrochloric acid can be used; however, when hydrochloric acid is used, the step of heat treatment generates hydrogen chloride gas, and furthermore, the following step of treatment with a calcium compound, particularly the step of treatment with calcium hydroxide, can not fix chlorine, so that hydrochloric acid is drained as waste water, and therefore, it is not practical; thus this official gazette contradicts the practical use of hydrochloric acid.

However, the present inventors have fundamentally reviewed the practical use of hydrochloric acid. Consequently, it has been found that if particular conditions are established, hydrochloric acid can be used, and furthermore it is more practical than sulfuric acid, and besides it is equivalent or superior to sulfuric acid in the ability to decompose fluorophosphoric acid, and thereby the efficiency of fixing and eliminating fluorine and phosphorus can be enhanced.

According to the present invention, hydrochloric acid loadings shall be taken as 2 to 10% by weight; namely, there is a feature in its loadings, wherein this concentration is the one in waste water. Thus acid loadings in the present invention shall be smaller than the ones in the above official gazette. Even such a smaller amount thereof can provide specified effects.

A concentration of less than 2%t by weight is insufficient therefor, wherein it takes too long to carry out hydrolysis. For example, even when waste water is treated therewith at a temperature of 95° C. for a period of eight hours, a remaining fluorine concentration is limited to 50 to 100 ppm.

A concentration of about 10% by weight provides a maximum effect thereof. Therefore, even if hydrochloric acid is added thereto so that the concentration thereof can be more than 10% by weight, not only the cost of hydrochloric acid is increased, but also an excessive amount of calcium hydroxide is required to neutralize an excess of hydrochloric acid, which causes an increase in cost. Furthermore, when the concentration thereof is more than 10% by weight, an amount of hydrogen chloride gas which is evaporated during heating is dramatically increased, and thus such a concentration is not preferred.

Incidentally, a concentration of 3 to 6% by weight within the range of 2 to 10% by weight is more preferable.

(Heating Temperature)

According to tho present invention, after adding hydrochloric acid thereto, waste water is heated. A heating temperature is in the range of 80° C. to the boiling point of waste water, more preferably 90° C. to the boiling point thereof. Incidentally, the boiling point of an aqueous solution including $PF_6^-$ and hydrochloric acid is on the order of 105° C.

Another feature of the present invention lies in this heating temperature; namely, a technique described in the above official gazette in which sulfuric acid is used prescribes that the upper limit of the heating temperature is 80° C., and describes that "when the heating temperature it more than 80° C., the solution is excessively condensed during treatment, so that it is difficult to carry out the following step of calcium treatment".

In case of hydrochloric acid, the above official gazette enumerates the generation of hydrogen chloride gas as a problem. On the basis of such problems, one of the skilled in the art would usually conceive the idea that the heating temperature should be lowered so as to suppress the generation of hydrogen chloride. However, the present invention is based upon the idea that the heating temperature should be rather elevated so as to accelerate the decomposition of fluorophosphoric acid.

According to the present invention, waste water is heated at a high temperature in the range of 800° C. to the boiling point thereof (on the order of 105° C.) so as to accelerate the reaction, and thereby fluorine and phosphorus can be fixed and eliminated to a lower concentration, respectively at a shorter period of time. Furthermore, the decomposition of fluorophosphate compound can be more efficiently decomposed.

Incidentally, the above treatment can be carried out even under atmospheric pressure.

(Condensation)

Generally, when a temperature is elevated, a liquid is only too ready to become a gas, and when water, hydrogen chloride or hydrogen fluoride is gasified, so that a volatile amount thereof is increased.

According to the invention, during heating, gases which generate in a treating vessel are introduce into a condenser. When an exhaust vent is provided on the upper side of the treating vessel, and the exhaust vent is connected with the condenser, the heated gases are naturally introduced into the condenser by cooling-condensing action. Additionally, the outlet of the condenser may be provided with an exhauster so as to forcibly introduce generated gases into the condenser. The gases as introduced into the condenser are cooled therein and become a liquid. The components of this liquid comprise hydrogen chloride, hydrogen fluoride and the like which have been volatilized by heating, as well as water. This liquid is recirculated into the treating vessel, and thereby physical matters as introduced into the treating vessel do not escape out of the system. All of toxic materials such as hydrogen chloride and hydrogen fluoride are recovered and eliminated. Furthermore, hydrogen chloride is effectively recycled to decompose fluorophosphoric acid. On the other hand, Japanese Patent Kokai No.170380 points out that "when the heating temperature is more than 80° C., the solution is excessively condensed during treatment, so that it is difficult to carry out the following step of calcium treatment": however, according to the present invention, water vapor as evaporated and transpired is condensed and refluxed, so that there occurs no problem of being concentrated to dryness.

(Heat Treating Time)

A heat treating period of time is in the range of 0.5 to 5 hours. When it is less than 0.5 hour, even if a hydrochloric acid concentration and a heating temperature are proper, it is not sufficient for treatment, and the remaining concentration of fluorine in a treated liquid is in the range of 50 to 100 ppm. When a heat treating period of time is more than two hours, the remaining concentration of fluorine in a treated liquid is gradually decreased with the passage of time; however, the concentration falls into an equilibrium state at a range of approximately 20 to 30 ppm. Under proper conditions for treatment, a treatment for a period of 1 to 3 hours is sufficient therefor.

(Calcium Hydroxide)

According to the present invention, after hydrolysis through a heat-treatment, calcium hydroxide is added to waste water so as to convert fluorine and phosphorus into an insoluble salt, respectively, while they are fixed and eliminated. According to this method, hydrogen fluoride and orthophosphoric acid which have been decomposed from fluorophosphate ions are reacted with calcium hydroxide added so as to generate insoluble calcium fluoride and tricalcium phosphate; and/or insoluble hydroxyapatite and fluoroapatite, respectively, which are thereafter precipitated.

A decomposed and treated liquid is quantitatively fed into a neutralizing-treating apparatus for fixing fluorine and phosphorus, wherein the alkalinity of pH=11 to 12 is once made with calcium hydroxide. Hydrogen fluoride and orthophosphoric acid which have been decomposed and generated thereby are fixed as insoluble salts as follows:

$$2HF + Ca(OH)_2 \rightarrow CaF_2 + 2H_2O$$

$$2H_3PO_4 + 3Ca(OH)_2 \rightarrow Ca_3(PO_4)_2 + 6H_2O$$

$$6H_3PO_4 + 10Ca(OH)_2 \rightarrow Ca_{10}(PO_4)_6(OH)_2 + 18H_2O$$

For the fixation and elimination of phosphorus which is an object of the present invention, the object can not be attained by using salt which can generate an acid as a by-product, such as calcium chloride or calcium nitrate. When calcium carbonate is used, a precipitate as produced by reacting calcium carbonate with phosphoric acid is a $CaHPO_4 \cdot 2H_4O$ crystal. Since this salt is considerably water-soluble, the remaining concentration of phosphorus in the treated water is in the range of 100 to 200 ppm, which is not sufficient therefor.

When calcium hydroxide is used, the treated liquid is alkaline, and thus the reaction with Ca is further advanced, so that insoluble salts such as higher-order calcium phosphate, hydroxyapatite and/or fluoroapatite are generated and precipitated.

Calcium hydroxide as excessively added is reversely neutralized into pH=6 to 8 according to the usual manner.

A treated liquid obtained in this way is subjected to solid-liquid separation by using a thickener, a separator or the like so as to separate it into an effluent and a solid matter.

On the basis of an official method, the concentrations of fluorine and phosphorus remaining in the treated water are analyzed and the quantity of each of them is determined, wherein waste water is treated under proper treating conditions, fluorine and phosphorus are fixed and eliminated to low levels of 30 ppm or less and 5 ppm or less, respectively.

On the other hand, waste water is treated with calcium hydroxide, hydrochloric acid remaining therein is transformed into calcium chloride according to the following formula:

$$2HCl+Ca(OH)_2 \rightarrow CaCl_2+2H_2O$$

Since calcium chloride generated is water-soluble, it remains dissolved in a drainage.

Calcium chloride is often used to eliminate fluorine, with which a degree of eliminating fluorine is larger than the one with calcium hydroxide. This is because calcium chloride is soluble, and thus a ratio of Ca/F during a reaction of eliminating fluorine can be properly set out.

(With Respect to Other Acids)

The kind of an acid with which a fluorophosphate compound can be treated was discussed.

A method of decomposition treatment with perchloric acid is adopted as a conventional method for a pretreatment for analyzing a sample including fluorophosphoric acid and determining the quantity of the same; however, it is necessary to handle this compound with care, and furthermore this compound is expensive, and thus if it is industrially used, there exist problems.

Sulfuric acid, which is used in Japanese Patent Kokai No.170380/94, is also suitable as one of industrial chemicals. However, when sulfuric acid is used in a large amount, in order to neutralize the acid content, the consumption of a large amount of calcium hydroxide is inevitable. Consequently, a large amount of waste is generated, which gives rise to large environmental problems.

Nitric acid also may seem to be effective; however, it should not be used from the viewpoint of the eutrophication of water quality.

Hydrogen fluoride and phosphoric acid also coincide with merely the object of acidifying waste water; however, each of the acids is weak as an acid, and thus satisfactory effects can not be expected.

Hydrochloric acid is a strong acid having a large degree of disassociation, and thus it is expected that hydrochloric acid will have a large effect on acidifying waste water, and furthermore since it is one of general-purpose industrial chemicals, it is available at a relatively moderate cost. The above Japanese Patent Kokai No.170380/94 discloses that hydrochloric acid is volatilized as hydrogen chloride gas during heat-treatment, and thus is disadvantageous; however, if a condenser is provided with a treating vessel, at the same time hydrogen chloride gas is condensed together with generated water vapor, there occurs no problems.

As a treating method of heating and hydrolyzing waste water including fluorophosphoric acid under conditions as mentioned above, both a batch method as can treat fluorophosphoric acid in batch operation and a continuous method as carried out by in series connecting treating vessels with each other can be used.

According to the continuous method, the operation and control of processes can be continuously carried out, and thus this method is remarkably advantageous in efficiency.

BRIEF DESCRIPTION OF DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
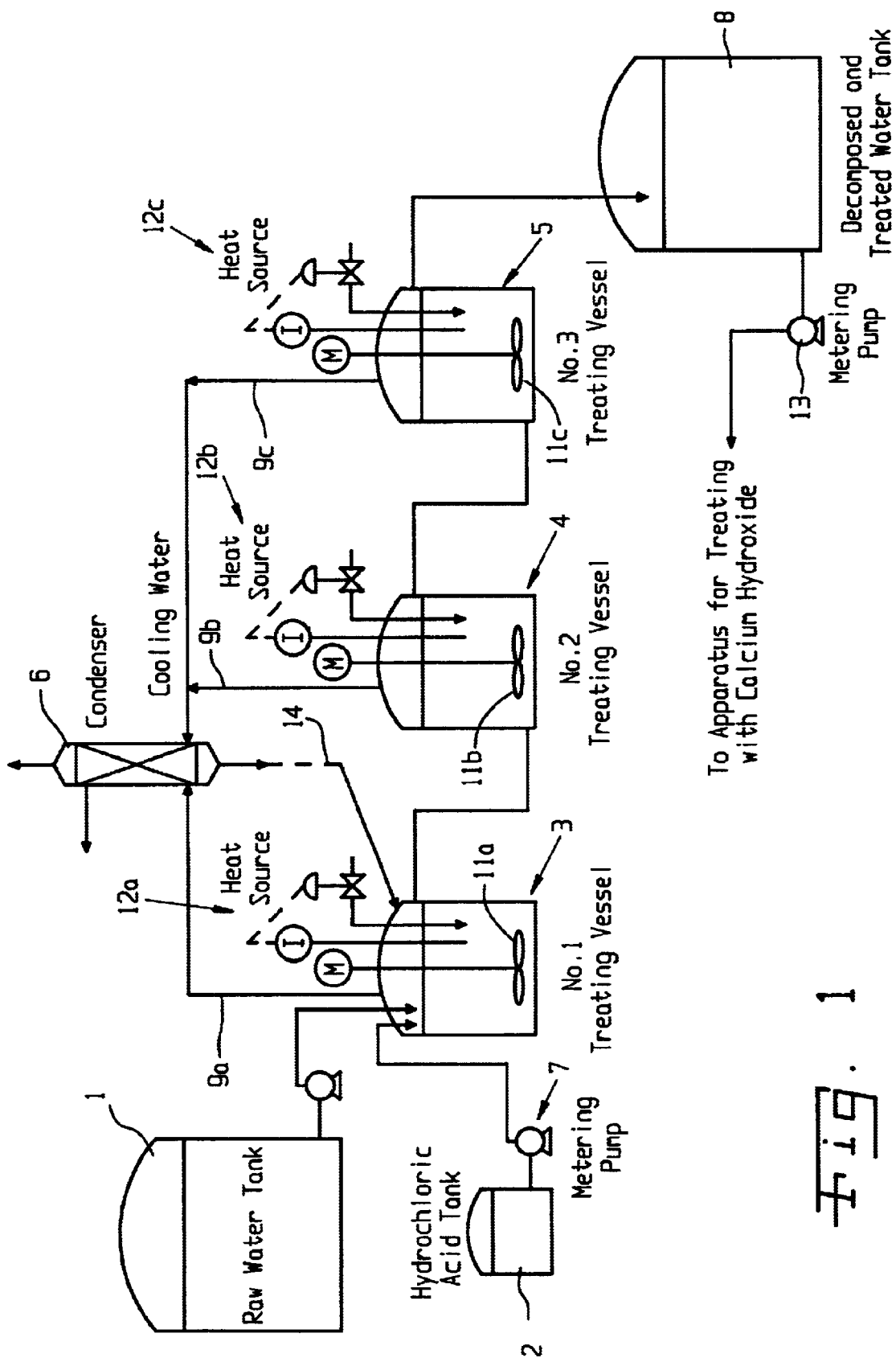
FIG. 1 is a schematic diagram illustrating a treating method of Embodiments of the present invention.

| | |
|---|---|
| 1 | raw water tank, |
| 2 | hydrochloric acid tank, |
| 3 | No.1 treating vessel, |
| 4 | No.2 treating vessel, |
| 5 | No.3 treating vessel, |
| 6 | condenser, |
| 7 | metering pump, |
| 8 | decomposed and treated water tank, |
| 9a, 9b, 9c | exhaust pipe, |
| 11a, 11b, 11c | agitator, |
| 12a, 12b, 12c | heat source, |
| 13 | metering pump, and |
| 14 | reflux pipe. |

BEST MODE FOR CARRYING OUT THE INVENTION

Corresponding reference characters indicate corresponding parts throughout the several views. The exemplification set out herein illustrates one preferred embodiment of the invention, in one form, and such exemplification is not to be construed as limiting the scope of the invention in any manner.

FIG. 1 shows a schematic diagram of a continuously heating and decomposing treatment, wherein "1" is a raw water tank which stocks with waste water. The raw water tank (1) is connected with treating vessels through a pump (10). The treating vessels consist of three vessels of No.1 treating vessel (3), No.2 treating vessel (4) and No.3 treating vessel (5), which are in series connected with each other.

Each of the treating vessels is provided with each of agitators (11a, 11b and 11c) as operated by each of motors (M), and each of heat sources (12a, 12b and 12c) which heats the inside of each of the treating vessels. Furthermore, a thermometer (T) for measuring the temperature in each of the treating vessels is also provided therein so that the driving of each of the heat sources (12a, 12b and 12c) can be controlled (by an on-off action) according to a temperature measured by each of the thermometers (T) and the temperature in each of the treating vessels (3, 4 and 5) can be controlled to a predetermined temperature; namely, the temperature in each of the treating vessels (3, 4 and 5) is detected by each of the thermometers (T), and then each of the heat sources (12a, 12b and 12c) is operated merely by an on-off action so that the temperature in each of the treating vessels (3, 4 and 5) can accord with an objective.

Incidentally, the heat sources for the treating vessels (3, 4 and 5) may be any one of electricity, vapor and other heating mediums. If there is no problem about the amount of waste water, it is effective to use water vapor. When water vapor is used, after heating, water vapor is added to waste water as water, and thus the concentration of waste water can be prevented.

On the other hand, a hydrochloric acid tank (2) is connected to the downstream side of No.1 treating vessel (3) through a metering pump (13). In the example as shown in FIG. 1, the tank (2) is connected to No.1 treating vessel (3); however, it can be also connected to No.2 treating vessel (4) and/or No.3 treating vessel (5) in parallel with each other.

On the upper side of each of the treating vessels (3, 4 and 5), each of exhaust pipes (9a, 9b and 9c) is provided through which each of the treating vessels is connected to a condenser. Cooling water is flown into the condenser (6), and thereby gases in the condenser (6) are cooled. Furthermore, the reference numeral "14" represents a reflux pipe, which is the one for refluxing a liquid as liquefied by the condenser (6) to No.1 treating vessel (3). In the example as shown in FIG. 1, the reflux pipe (14) is connected to No.1 treating vessel (3); however, the reflux pipe (14) can be connected to each of the treating vessels. In particular, when a hydrochloric acid concentration in the treating vessel(s) at the following stage(s) is lower, if the liquefied liquid is refluxed to the following stage(s), hydrochloric acid can be preferably supplemented therein.

To the downstream side of No.3 treating vessel which is the last stage treating vessel, a decomposed and treated water tank (8) is connected, and to the downstream side of the decomposed and treated water tank (8), an apparatus for treating with calcium hydroxide (not shown diagrammatically) is connected through a metering pump (7).

Continuous treating operations are schematically carried out as follows:

Waste water including a fluorophosphate is stocked in the raw water tank (1) having a proper volume, and is fed to No.1 treating vessel (3) by a metering pump (10) as provided. In this case, for example, if three treating vessels (3, 4 and 5) each of which has a volume of 1 m³ are used, and the amount of water-supply is 1 m³/hour, the whole residence time is 3 hours; namely, when waste water is fed from the raw water tank (1) to No.1 treating vessel (3) at a rate of 1 m³/hour, waste water overflows No.1 treating vessel (3) after one hour, and is fed into No.2 treating vessel. After two hours, waste water overflows No.2 treating vessel (4), and the overflown waste water is fed into No.3 treating vessel (5). After three hours, waste water overflows No.3 treating vessel (5), and the overflown waste water is fed into the decomposed and treated water tank (8).

Corresponding to the amount of water-supply, hydrochloric acid is quantitatively added to No.1 treating vessel (3) so that the concentration of hydrochloric acid in waste water as fed into No.1 treating vessel (3) can be in the range of 2 to 10% by weight.

Each of the treating vessels (3, 4 and 5) is heated by the on-action of each of heat sources (12a, 12b and 12c) so that a temperature of 75° to 110° C. can be maintained therein. From each of the treating vessels (3, 4 and 5), a plenty of water vapor and hydrogen fluoride which has been generated with hydrochloric acid added and by decomposition are volatilized. If these gases are introduced into a provided condenser (6), liquefied, and refluxed into the original treating vessels (3, 4 and 5), a loss in acid components and a fly loss to the outside are prevented from occurring, and thus there occurs no problem.

The temperature in each of the treating vessels is detected, and then the heating is operated merely by an on-off action so that the temperature in each of the treating vessels can accord with an objective.

Incidentally, it is not necessary that the temperatures in all of the treating vessels are identical with each other. For example, if the temperature is set up so that it can be lower at the following stage, all of evaporated water and hydrogen chloride are recovered through condensation, and thus the solution is not concentrated at all, and thereby the treatment with calcium hydroxide at the following step comes to be easy, and thus it is preferable. For example, No.1 treating vessel is set up at a temperature of 950° to 100° C., No.2 treating vessel is set up at a temperature of 85° to 95° C., and No.3 treating vessel is set up at a temperature of 80° to 85° C. Of course, this is one example, the preset temperatures can be properly varied according to the degree of hydrolysis in the actual treatment state.

Incidentally, added hydrochloric acid acts as a catalyst in chemical reactions, hydrochloric acid itself is not consumed in the reactions. As can be taken from a method of the present invention, when hydrogen chloride gas which has been once transpired is condensed and recovered, added hydrochloric acid can be balanced with the original amount.

A liquid which has been thermally decomposed and treated overflows a treating vessel at the final stage (corresponding to No.3 treating vessel (5) in FIG.1) an is stocked in a decomposed and treated liquid tank (8).

A decomposed and treated liquid is quantitatively fed into a neutralizing-treating apparatus for fixing fluorine and phosphorus, wherein the alkalinity of pH=11 to 12 is once made With calcium hydroxide. Hydrogen fluoride and orthophosphoric acid which have been decomposed and generated thereby are fixed as insoluble salts as follows:

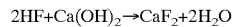

$2HF+Ca(OH)_2 \rightarrow CaF_2+2H_2O$

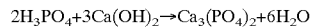

$2H_3PO_4+3Ca(OH)_2 \rightarrow Ca_3(PO_4)_2+6H_2O$

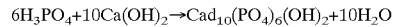

$6H_3PO_4+10Ca(OH)_2 \rightarrow Ca d_{10}(PO_4)_6(OH)_2+10H_2O$

As a calcium salt which is used for fixing and eliminating fluorine and phosphorus, it is indispensable to use calcium hydroxide. When calcium chloride or calcium nitrate is used, hydrochloric acid or nitric acid is produced as a by-product, and thereby waste water is acidified, and thus not only the object of fixing and eliminating fluorine and phosphorus is not attained, but also a further neutralizing agent is required, which is not economical.

EMBODIMENTS

Embodiment 1

133.5 g of LiPF$_6$ was dissolved in water into 10 liters so that the concentration of fluorine therein could be 10000 ppm. To this liquid including PF$_6^-$, hydrochloric acid was added and solutions were prepared so that HCl concentration thereof could be 2, 5, 10 and 20% respectively. Each of the solutions was thermally decomposed and treated at a temperature of 95° C. for a period of 0.5, 1 or 2 hours. Thereafter, fluorine in each of the treated solutions was fixed with calcium hydroxide. The concentration of fluorine in each of the solutions was determined. Consequently, results as shown in Table 1 were obtained.

TABLE 1

Remaining Fluorine (ppm)

| (%) HCl Conc. | Treating Time (Hours) | | | | | | |
|---|---|---|---|---|---|---|---|
| | 0.25 | 0.5 | 1 | 2 | 3 | 5 | 10 |
| 0 | 10000 | 10000 | 9200 | 7400 | 4200 | 1800 | 350 |
| 1 | 1800 | 1200 | 300 | 150 | 60 | 40 | 28 |
| 2 | 600 | 300 | 90 | 40 | 33 | 26 | 25 |
| 3 | 300 | 210 | 70 | 36 | 31 | 24 | 20 |
| 5 | 200 | 150 | 55 | 35 | 22 | 20 | 20 |
| 6 | 180 | 120 | 50 | 30 | 22 | 20 | 19 |
| 10 | 150 | 100 | 45 | 25 | 22 | 21 | 20 |
| 20 | 145 | 45 | 40 | 30 | 20 | 20 | 18 |

COMPARATIVE EXAMPLE 1

Figure 2:
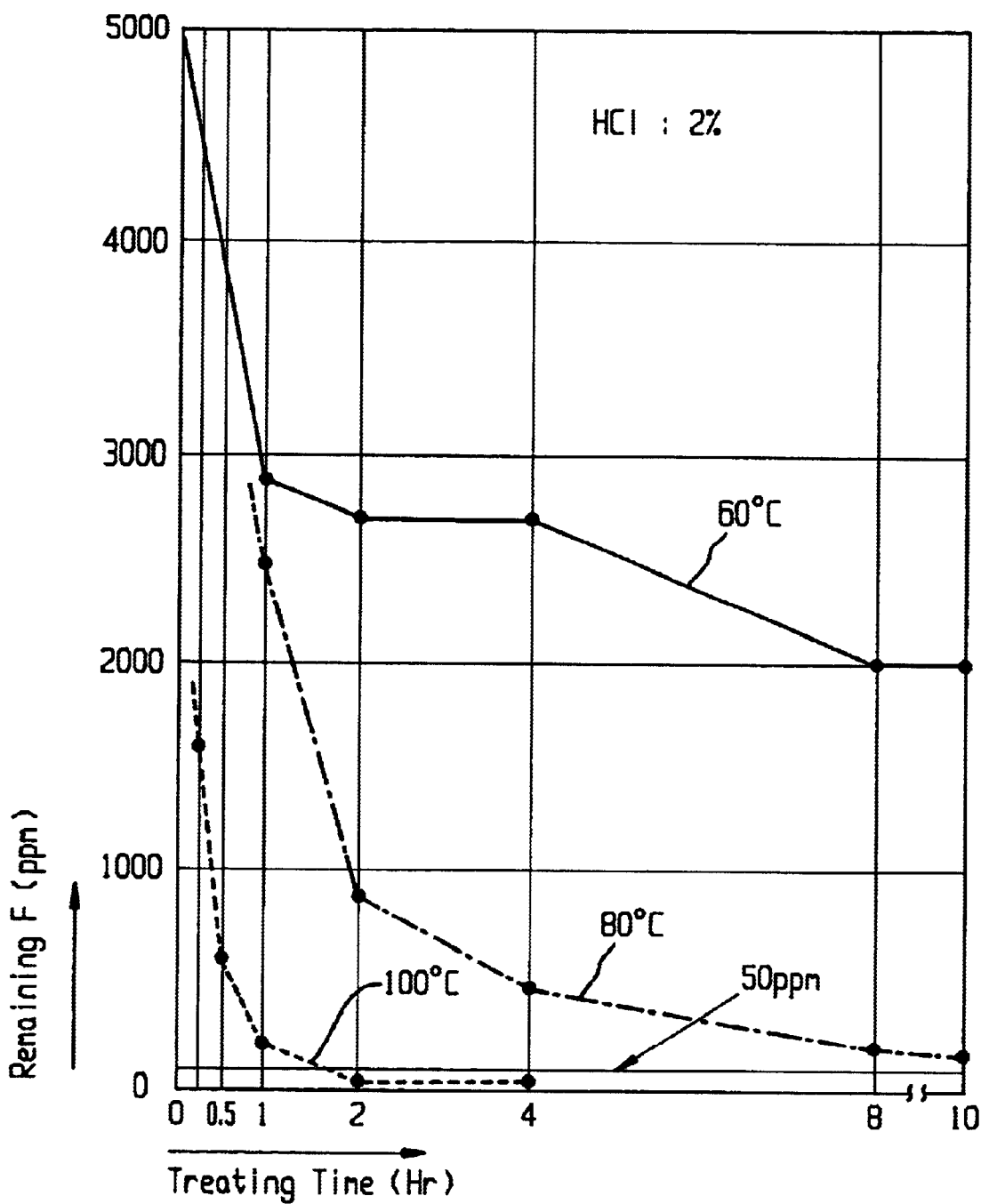
FIG. 2 is a graph showing a test result of Embodiment 5 wherein hydrochloric acid is ot 2% in concentration.

To waste water having a total fluorine concentration of 44,000 ppm and a PF6−fluorine concentration of 3,200 ppm, sulfuric acid was added so that the concentration of $H_2SO_4$ therein can be 5, 10 and 20%. Thereafter, waste water was thermally hydrolyzed at a temperature of 80° to 85° C., and then fluorine therein was fixed with calcium hydroxide. The concentration of the remaining fluorine in each of the treated liquids was determined. Consequently, results as shown in FIG. 2 were obtained.

TABLE 2

| (%) $H_2SO_4$ Conc. | Treating Time (Hours) | | |
|---|---|---|---|
| | 0.5 | 1 | 2 |
| 5 | 450 | 500 | 150 |
| 10 | 825 | 265 | 48 |
| 20 | 225 | 25 | 35 |

Sulfuric acid is lower in decomposition ability than hydrochloric acid, and thus a large amount of sulfuric acid is required.

Embodiment 2

An aqueous solution having a $LiPF_6$ concentration of 3000 ppm, HF=3% and HCl=2% was thermally decomposed and treated at a temperature of 95° to 98° C. Samples were gathered every definite period of time, and then fluorine in each of the samples was fixed with calcium hydroxide, and thereafter the concentration of each of the remaining fluorine and phosphorus was determined. Consequently, results as shown in Table 3 were obtained.

TABLE 3

| Treating Time (Hours) | 0.5 | 1 | 2 | 4 | 8 | 16 |
|---|---|---|---|---|---|---|
| Remaining F | 560 | 51 | 19 | 17 | 16 | 14 |
| Remaining P | 150 | 1 | 1 | 1 | | * |

*1 or less

From these results, it is found that the decomposition is balanced by heat-treatment for a period of merely two hours.

Embodiment 3

To waste water having a total fluorine concentration of 82,000 ppm, a $PF_6^-$—F concentration of 2000 ppm, and a phosphorus concentration of 560 ppm, hydrochloric acid was added so that the concentration of HCl therein can come to be 3%, and then the waste water was thermally decomposed and treated at a temperature of 95° to 100° C. for a period of 4 hours, and then the waste water was treated with calcium hydroxide. When the treated water was analyzed, the concentrations of the remaining fluorine and phosphorus were 15 ppm and 1 ppm or less, respectively.

COMPARATIVE EXAMPLE 2

Using the same waste water as the one in Embodiment 1, the waste water was treated under similar thermal decomposition conditions. The treated waste water was treated with calcium carbonate, and was analyzed. Consequently, the concentrations of the remaining fluorine and phosphorus therein were 18 ppm and 100 ppm, respectively. From the results, the produced phosphate is considered as $CaHPO_4 \cdot 2H_2$.

Embodiment 4

Waste water having a total fluorine concentration of 44,800 ppm, a $PF_6^-$—F concentration of 4000 ppm, and a HCl concentration of 3.5% was fallen into heat-treating vessels as shown in FIG. 1, in which each of three treating vessels is provided with an agitator and a heating device, and is connected to the others in series, so that the residence time per vessel can be one hour, and the total residence time can be three hours, and thereafter the waste water was continuously treated at a temperature of 90° to 100° C. for a period of 8 hours. Samples were gathered at intervals of one hour, and fluorine therein was fixed with calcium hydroxide, and the remaining fluorine and phosphorus in the treated water were analyzed. Consequently, results as shown in Table 4 were obtained.

TABLE 4

| Treating Time (Hours) | 1 | 2 | 3 | 4 | 5 | 6 | 7 | 8 |
|---|---|---|---|---|---|---|---|---|
| Remaining F | 17 | 26 | 20 | 20 | 26 | 26 | 25 | 24 |
| Remaining P | * | 2 | 1 | 1 | 2 | 2 | 1 | 1 |

*: 1 or less

It is found that a stable treatment can be carried out even according to a continuous system.

Embodiment 5

133.2g of $LiPF_6$ was dissolved in 20 liters of pure water so that a $PF_6^-$F concentration can be 5.000 ppm, and thus a test liquid was prepared.

2 liters of this test liquid was taken out as a liquid sample, and 35% hydrochloric acid was added to three liquid samples so that HCl concentrations of the liquid samples can be 2, 6 and 10%, respectively.

The liquid samples to which hydrochloric acid was added were introduced into a thermally decomposing vessel, and were heated and controlled by a breathing tube for steam so that a predetermined decomposing temperature can be provided.

After a thermal decomposition for a predetermined period of time, 100 ml of the liquid samples were taken out, an excessive amount of slaked lime was added thereto so as to make it alkaline, and the samples were reversely neutralized with sulfuric acid, and filtered, and thus transparent liquids were obtained.

Next, after steam distillation, a $F^-$ concentration was determined, and thus the remaining fluorine was determined.

The results are shown in Table 5. Furthermore, each of FIGS. 2 to 4 shows the same as a graph.

TABLE 5

| Hydro-chloric Acid (%) | Treating Temp. (°C.) | Treating Time (Hr.) | | | | | | |
|---|---|---|---|---|---|---|---|---|
| | | 0.25 | 0.5 | 1 | 2 | 4 | 8 | 10 |
| 2 | 60 | | | 2880 | 2720 | 2720 | 2000 | 2000 |
| | 80 | | | 2480 | 880 | 440 | 168 | 136 |
| | 100 | 1600 | 600 | 184 | 16 | 16 | | |
| 6 | 60 | | | 2850 | 2000 | 1200 | 5600 | |
| | 80 | | | 1200 | 360 | 38 | 20 | |
| | 100 | 44 | 38 | 25 | 30 | 24 | | |
| 10 | 60 | | | 1600 | 900 | 192 | 56 | 30 |
| | 80 | | | 152 | 48 | 27 | 23 | |
| | 100 | 38 | 28 | 22 | 30 | 28 | | |

Figure 3:
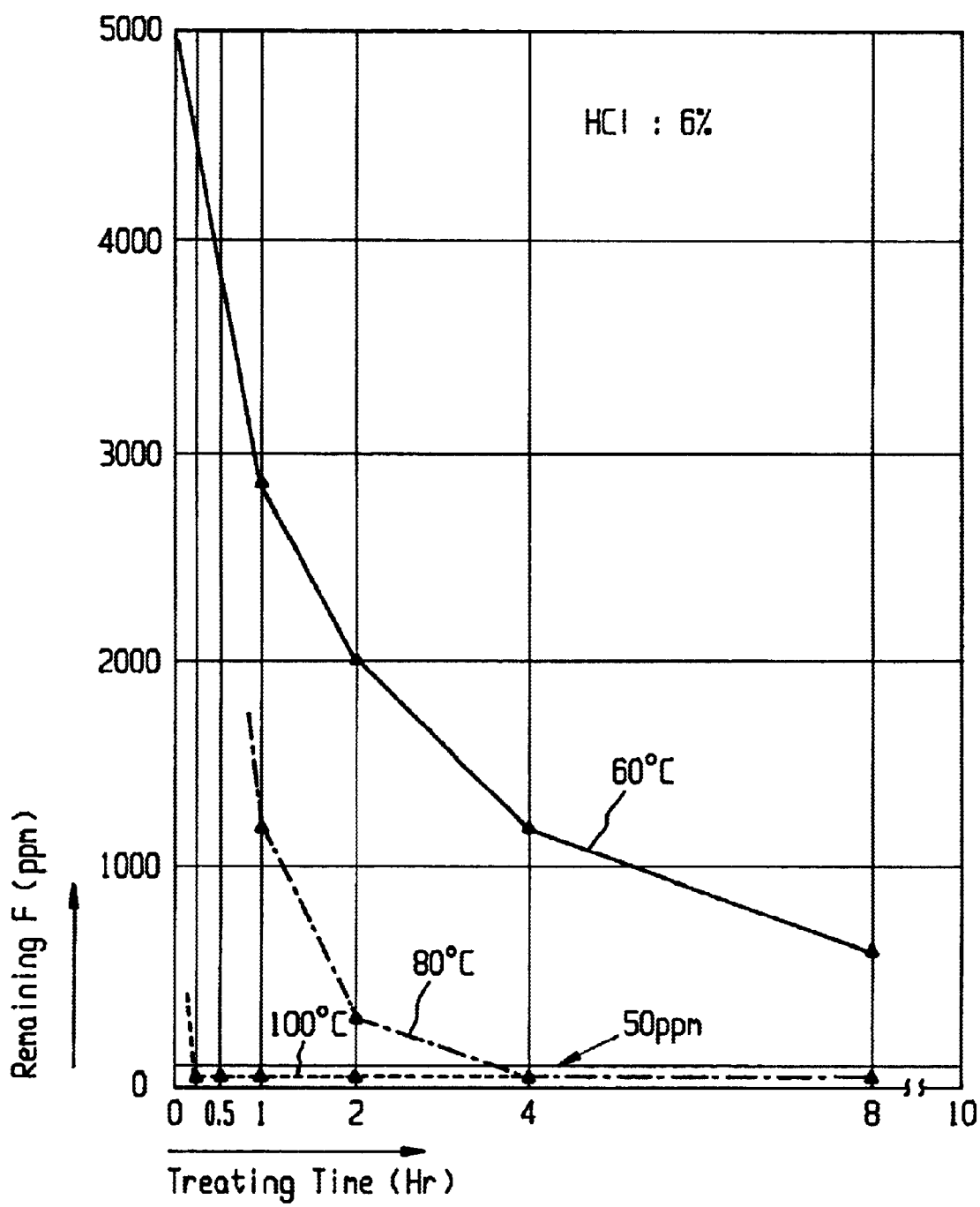
FIG. 3 is a graph showing a test result of Embodiment 5 wherein hydrochloric acid is of 6% in concentration.
Figure 4:
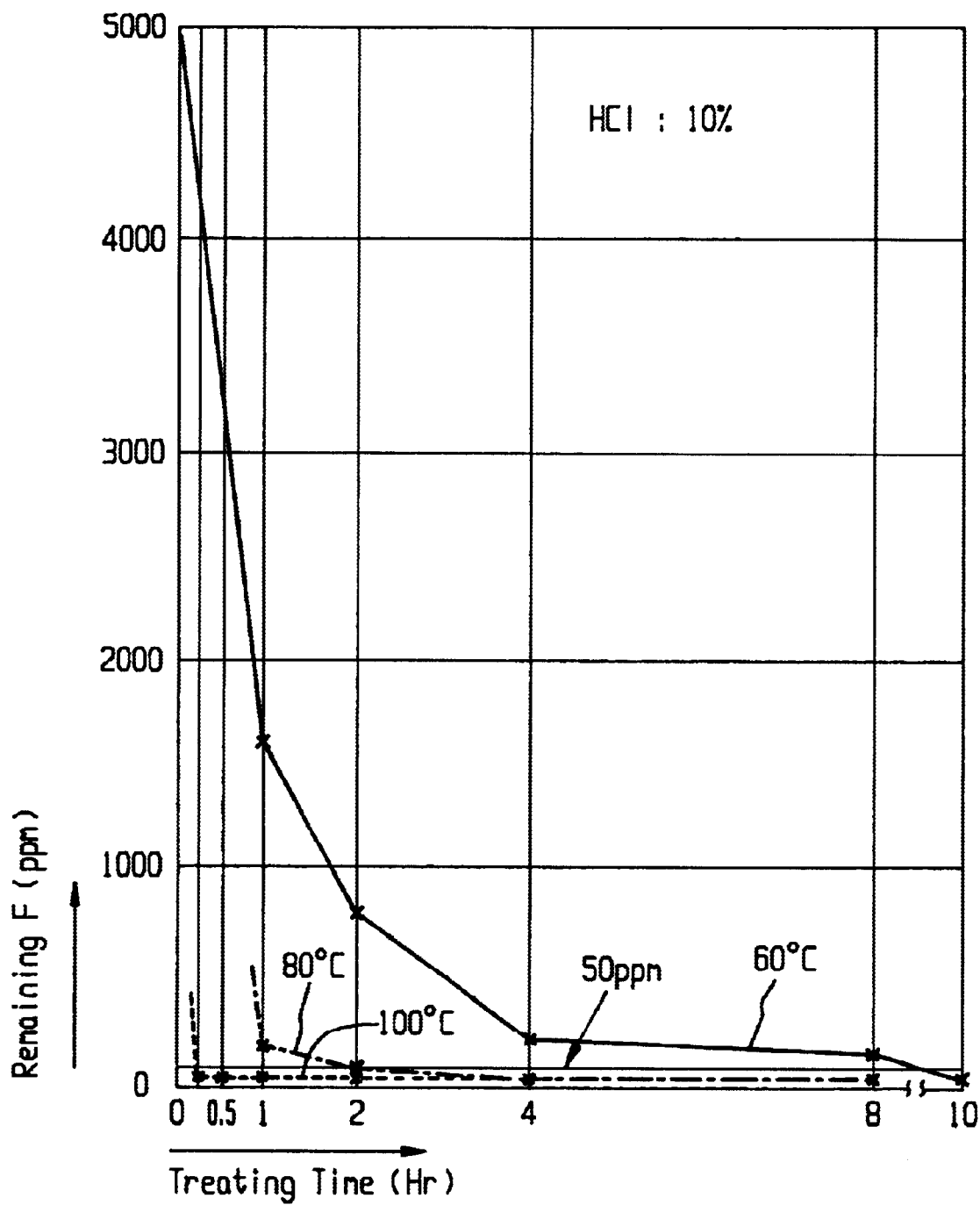
FIG. 4 is a graph showing a test result of Embodiment 5 wherein hydrochloric acid is of 10% in concentration, wherein numeral references are.

As shown in Table 5 and FIGS. 2 to 4, the decomposition efficiency of $PF_6^-$ largely depends upon a treating temperature. In particular, a temperature of in the range of 80° C. to the boiling point of treated water is preferable, a temperature of in the range of 90° C. to the boiling point of treated water is more preferable. Incidentally, the boiling point of an aqueous solution as contaminated with $PF_6^-$ and hydrochloric acid is about 105° C.

Besides, when a hydrochloric acid concentration is more than 2%, decomposition efficiency comes to be higher. Even in case of a low hydrochloric acid concentration such as 2%, if treatment is carried out at a treating temperature of about 100° C. for a treating period of about 2 hours, the remaining fluorine concentration can be 20 ppm or less.

The Availability on the Industry

According to the present invention, with hydrochloric acid and calcium hydroxide as commonly used as industrial chemicals, by using simple procedures such as a heat-treatment, fluorophosphoric acid is decomposed into hydrogen fluoride and phosphoric acid, fluorine and phosphorus are fixed and eliminated, and thus the concentrations of fluorine and phosphorus in waste water can be lowered to a low level.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of fixing and precipitating fluorine and phosphorus from waste water wherein the waste water includes a fluorophosphate compound, the method comprising the steps of adding hydrochloric acid to said waste water within a treating vessel, said hydrochloric acid being added in an amount so that a concentration of said hydrochloric acid in said waste water is in the range of 2% to 10% by weight, heating within said treating vessel said waste water to which said hydrochloric acid has been added to a temperature in the range of more than 80° C. to the boiling point of said waste water to decompose said fluorophosphate compound into a hydrogen fluoride and a phosphoric acid, hydrogen chloride gas being generated during the decomposition of said fluorophosphate compound, directing the generated hydrogen chloride gas out of said treating vessel and into a condenser provided outside of said treating vessel, and adding a calcium compound to said waste water after said decomposition to fix and precipitate the fluorine and the phosphorus.

2. The method of fixing and precipitating fluorine and phosphorus in waste water wherein the waste water includes a fluorophosphate compound according to claim 1, including the further steps of condensing said hydrogen chloride gas in said condenser into a hydrochloric acid, and refluxing said condensed hydrochloric acid in said waste water located within said treating vessel.

3. The method of fixing and precipitating fluorine and phosphorus in waste water wherein the waste water includes a fluorophosphate compound according to claim 2, in which said waste water to which said hydrochloric acid has been added is heated for a duration of time in the range of 0.5 to 5 hours.

4. The method of fixing and precipitating fluorine and phosphorus in waste water wherein the waste water includes a fluorophosphate compound according to claim 2, in which said waste water to which said hydrochloric acid has been added is heated at a temperature in the range of 90° C. to the boiling point of said waste water.

5. The method of fixing and precipitating fluorine and phosphorus in waste water wherein the waste water includes a fluorophosphate compound according to claim 2 wherein said calcium compound is calcium hydroxide.

6. The method of fixing and precipitating fluorine and phosphorus in waste water wherein the waste water includes a fluorophosphate compound according to claim 1, in which said concentration of said hydrochloric acid in said waste water is in the range of 3% to 6% by weight.

7. The method of fixing and precipitating fluorine and phosphorus in waste water wherein the waste water includes a fluorophosphate compound according to claim 6, in which said waste water to which said hydrochloric acid has been added is heated for a duration of time in the range of 0.5 to 5 hours.

8. The method of fixing and precipitating fluorine and phosphorus in waste water wherein the waste water includes a fluorophosphate compound according to claims 6, in which said waste water to which said hydrochloric acid has been added is heated at a temperature in the range of 90° C. to the boiling point of said waste water.

9. The method of fixing and precipitating fluorine and phosphorus in waste water wherein the waste water includes a fluorophosphate compound according to claim 6 wherein said calcium compound is calcium hydroxide.

10. The method of fixing and precipitating fluorine and phosphorus in waste water wherein the waste water includes a fluorophosphate compound according to claim 1, in which said waste water to which said hydrochloric acid has been added is heated for a duration of time in the range of 0.5 to 5 hours.

11. The method of fixing and precipitating fluorine and phosphorus in waste water wherein the waste water includes a fluorophosphate compound according to claim 10 wherein said calcium compound is calcium hydroxide.

12. The method of fixing and precipitating fluorine and phosphorus in waste water wherein the waste water includes a fluorophosphate compound according to claim 1, in which said waste water to which said hydrochloric acid has been added is heated at a temperature in the range of 90° C. to the boiling point of said waste water.

13. The method of fixing and precipitating fluorine and phosphorus in waste water wherein the waste water includes a fluorophosphate compound according to claim 12 wherein said calcium compound is calcium hydroxide.

14. The method of fixing and precipitating fluorine and phosphorus in waste water wherein the waste water includes a fluorophosphate compound according to claim 1 wherein said calcium compound is calcium hydroxide.

15. A method of fixing and precipitating fluorine and phosphorus in waste water including a fluorophosphate compound, the method being characterized in that hydrochloric acid is added to said waste water within a treating vessel, said waste water including said fluorophosphate compound, said hydrochloric acid being added in an amount so that the concentration of hydrochloric acid in said waste water can be in the range of 2% to 10% by weight; then said waste water to which hydrochloric acid has been added is heated within said treating vessel to a temperature in a range of more than 80° C. to the boiling point of said waste water so as to decompose said fluorophosphate compound into hydrogen fluoride and phosphoric acid, hydrogen chloride gas being generated during the decomposing of said fluorophosphate compound and accumulating in said treating vessel, the hydrogen chloride gas in said treating vessel is directed into a condenser provided out of said treating vessel; and then a calcium compound is added to said waste water after decomposition to fix and precipitate fluorine and phosphorus.

* * * * *